United States Patent
Ersoy

(10) Patent No.: US 6,431,047 B1
(45) Date of Patent: Aug. 13, 2002

(54) BRAKE SERVO UNIT

(75) Inventor: Metin Ersoy, Walluf (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,013

(22) PCT Filed: Apr. 26, 2000

(86) PCT No.: PCT/DE00/01293

§ 371 (c)(1),
(2), (4) Date: Mar. 5, 2001

(87) PCT Pub. No.: WO00/66409

PCT Pub. Date: Nov. 9, 2000

(30) Foreign Application Priority Data

Apr. 30, 1999 (DE) .......................... 199 19 872

(51) Int. Cl.[7] .................................. F15B 9/10
(52) U.S. Cl. .................................... 91/376 R
(58) Field of Search .............. 91/376 R, 374, 91/369.2

(56) References Cited

U.S. PATENT DOCUMENTS

| | | |
|---|---|---|
| 3,303,751 A | 2/1967 | Bratten |
| 3,646,758 A | 3/1972 | Cripe |
| 4,576,004 A | 3/1986 | Bach |
| 5,044,255 A | 9/1991 | Carre et al. |
| 5,046,314 A | 9/1991 | Levrai |
| 6,116,141 A * | 9/2000 | Levrai ...................... 91/170 R |

* cited by examiner

Primary Examiner—Edward K. Look
Assistant Examiner—Michael Leslie
(74) Attorney, Agent, or Firm—McGlew and Tuttle, P.C.

(57) ABSTRACT

A brake power booster with a brake power booster housing has at least one vacuum chamber and at least an additional pressure chamber, into which ambient pressure can be admitted during the actuation of an actuating pedal for the brake system of the motor vehicle. The actuating pedal is connected to the brake power booster. A vacuum can be established in the pressure chamber in the non-operative position of the actuating pedal, wherein the vacuum chamber and the pressure chamber are separated from one another by a displaceable piston. The brake power booster has at least one additional vacuum chamber, which can be connected to the pressure chamber via a switching device. The switching device establishes the connection between the pressure chamber and the additional vacuum chamber during the return of the actuating pedal after the actuation process.

3 Claims, 1 Drawing Sheet

BRAKE SERVO UNIT

FIELD OF THE INVENTION

The present invention pertains to a brake power booster for motor vehicles with a brake power booster housing, at least one vacuum chamber and at least one additional pressure chamber, into which ambient pressure can be admitted during the actuation of an actuating pedal for the brake system of the motor vehicle, which actuating pedal is connected to the brake power booster, and into which the vacuum can be established in the non-operative position of the actuating pedal. The vacuum chamber and the pressure chamber are separated from one another by a displaceable piston. Furthermore, the brake power booster has at least one additional vacuum chamber, which can be connected to the pressure chamber via a switching device.

BACKGROUND OF THE INVENTION

To assist the driver of the motor vehicle in the case of a braking operation and to provide additional braking power for actuating the brake system, brake power boosters of this type are now customarily used in the automobile industry. To boost the brake power, the assistance of the vacuum generated by the engine is utilized, and the brake power introduced into the brake system by the pivoting of the actuating pedal can be boosted up to fivefold. This is achieved, in principle, by the vacuum generated by the engine being admitted into both the vacuum chamber and the pressure chamber of the brake power booster in the non-operative state of the brake system so that they are at equilibrium. A pivoting of the actuating pedal of the brake system interrupts the connection present between the two chambers and opens the rear pressure chamber of the brake power booster, which faces the actuating pedal, to the atmospheric air, so that air under atmospheric pressure can flow into this pressure chamber. The piston located between the vacuum chamber and pressure chamber is displaced by the atmospheric pressure, together with the diaphragm connected thereto, in the forward direction, i.e., in the direction of the engine and the pivoting movement of the actuating pedal is thus assisted, and the movement of the piston acts on the piston rod of a connected main brake cylinder via suitable transmission members. After the end of the pivoting of the actuating pedal, the interrupted connection between the pressure chamber, the vacuum chamber and the engine-side vacuum connection is again established, so that a rearward movement of the actuating pedal into its starting position is made possible.

It is problematic for the use of this prior-art brake power booster that the necessary vacuum can no longer be provided to the sufficient extent by the modem gasoline and diesel engines being increasingly used. This applies especially to engines with fuel injection, in which the vacuum generated by the engine is no longer sufficient to bring about the desired additional boosting of the brake power and the necessary braking dynamics. This problem is remedied by the use of additional vacuum pumps, but they are disadvantageous because they require space for their installation and, in addition, also cause a rather substantial increase in the manufacturing costs of the entire brake system.

Increasing the area of the piston of the brake power boosters used is also ruled out as a possible solution because of the limited space conditions in the engine compartments of modern motor vehicles.

SUMMARY AND OBJECTS OF THE INVENTION

The object of the present invention is therefore to further improve a brake power booster for the brake system of a motor vehicle such that a sufficient amount of vacuum is always present for a sufficient number of successive braking operations with a simple design. The costs for such a brake power booster shall increase only slightly, if at all, compared with the brake power booster variants used hitherto.

A brake power booster with a brake power booster housing has at least one vacuum chamber and at least an additional pressure chamber, into which ambient pressure can be admitted during the actuation of an actuating pedal for the brake system of the motor vehicle. The actuating pedal is connected to the brake power booster. A vacuum can be established in the pressure chamber in the non-operative position of the actuating pedal, wherein the vacuum chamber and the pressure chamber are separated from one another by a displaceable piston. The brake power booster has at least one additional vacuum chamber, which can be connected to the pressure chamber via a switching device.

According to this technical teaching, it is advantageous for the switching device to establish the connection between the pressure chamber and the additional vacuum chamber after the return of the actuating pedal after the actuation process.

The additional vacuum chamber forms an energy reservoir here, which can be used during the braking operation and is charged from the engine during time periods during which no braking operation takes place. The storage of the vacuum guarantees that the low vacuum still provided will be sufficient for a sufficient number of braking operations even in the case of the modern motor vehicle engines currently in use. The additional vacuum reservoir ensures that the vacuum necessary during the return of the piston of the brake power booster is also sufficient for a rapid succession of braking maneuvers despite the weak suction effect of the engine. The special design according to the present invention does not require an additional foreign energy source but only additional costs due to the provision of a suitable switching device, with which the additional vacuum chamber can be connected to the pressure chamber.

It proved to be particularly advantageous for the additional vacuum chamber of the brake power booster housing to be arranged in a stiffening cavity. Stiffening cavities made in plastic within the brake power booster housing are common and present in all customary designs of brake power boosters because of the necessary strength of the brake power booster housing. These cavities can be utilized in the manner according to the present invention without enlarging the overall installation volume of the brake power booster for the necessary additional vacuum chamber. Thus, there are no additional costs due to an external vacuum reservoir connected to the brake power booster.

According to another embodiment of the present invention, provisions are made for the switching device to be designed as a solenoid on-off valve.

An exemplary embodiment of the subject of the present invention will be explained in greater detail below on the basis of the drawing attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
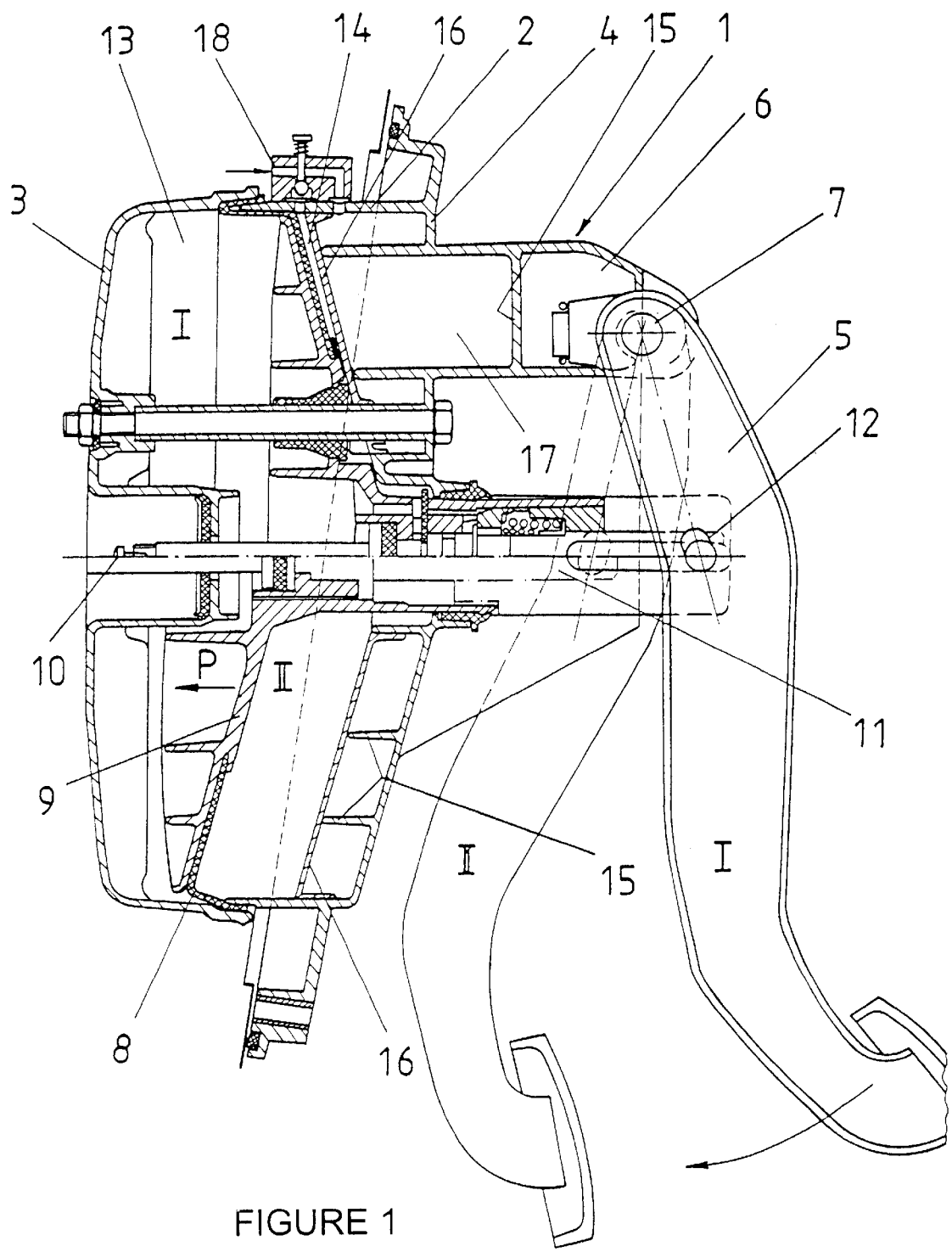
FIG. 1 is a sectional side view through the brake power booster of a motor vehicle with an actuating pedal arranged at the brake power booster.

Referring to the drawings in particular, the brake power booster, designated by 1 in its entirety, has a brake power booster housing 2, which comprises an engine-side housing bell 3 and a rear housing bottom 4 facing the actuating pedal 5. Both the housing bell 3 and the housing bottom 4 are made of plastic. The housing bottom 4 has a mounting block 6, on which the upper, free end of the actuating pedal 5 is articulated in a pivot bearing 7. A diaphragm 8 made of an elastic material, preferably rubber, which is axially displaceable together with a piston 9 in the direction of the principal axis 10 of the brake power booster 1, is arranged inside the brake power booster housing 2. The piston 9 and the diaphragm 8 are connected to an actuating rod 11, which is mounted with its free end projecting from the brake power booster 1 in an elongated hole 12 of the actuating pedal 5.

The drawing attached shows the brake power booster according to the present invention in both a non-operative position I (shown at the top of the Figure) and a brake actuation position II (shown at the bottom of the Figure), in which the actuating pedal 5 (shown by dash-dotted line) has been pivoted forward, in the direction of the engine compartment, by the driver of the vehicle. The non-operative position I of the brake power booster is shown in the upper area above the principal axis 10, while the actuation position II is shown below the principal axis 10 in the lower area of the brake power booster 1. It appears clearly that a vacuum chamber 13, to which vacuum is admitted, is present in the non-operative position I between the front, engine-side wall of the brake power booster housing and the piston 9. A vacuum is also established by admission to the opposite side 14 of the piston 9 in the non-operative position and this side forms a pressure chamber 14, designed as a narrow gap, in the non-operative position. The pressure chamber 14 is limited toward the housing bottom 4 by a wall 16. A plurality of stiffening ribs 15, which define a closed additional vacuum chamber 17 due to their arrangement, are located between the wall 16 and the outside of the brake power booster housing. This additional vacuum chamber 17 is connected via a switching device 18 to an engine-side vacuum connection, which is not shown here specifically for clarity's sake.

The vacuum generated by the engine is admitted into both the vacuum chamber 13, the pressure chamber 14 and the additional vacuum chamber 17 in the non-operative position I.

If the actuating pedal 5 is brought into the position designated by II in the drawing within the framework of a braking operation, the connection between the pressure chamber 14 and the engine-side vacuum line is interrupted. At the same time, a connection is established to the ambient air, so that atmospheric pressure is now admitted into the pressure chamber 14 and the pivoting movement of the actuating pedal is assisted by the admission of pressure to the piston 9 in the direction of the arrow P. The end position of the pivoting movement of the actuating pedal 5 in the partial view II shows that the vacuum chamber 13 has been made substantially smaller by the axial displacement of the piston 9, whereas the volume of the pressure chamber 14 has increased appreciably compared with the non-operative position I.

To make possible a rearward movement of the piston 9 in conjunction with the pivoting back of the actuating pedal 5, the switching device 18 establishes a connection between the additional vacuum chamber 17 and the pressure chamber 14 after the end of the braking operation. The admission of pressure to the piston 9 is thus eliminated, so that the entire brake system can again return into its non-operative position, assisted by suitable spring forces. A repeated pivoting of the actuating pedal 5, performed immediately after the return into the non-operative position, leads to the repeated admission of atmospheric pressure into the pressure chamber 14 and thus to a repeated displacement of the piston 9 in the direction of arrow P. A plurality of successive braking operations are possible with corresponding assist by the brake power booster due to the vacuum stored within the additional vacuum chamber, without a decline of the brake-assisting power taking place, even if the connected motor vehicle engine would not be able alone to provide a sufficient vacuum during the rapid succession of the braking operations.

A sufficient vacuum is thus always made available for the actuation of the brake system of the motor vehicle without increasing the volume of a prior-art brake power booster. Thus, the performance of the vacuum brake power system is improved without additional drives or foreign energy sources being used; in addition, only extremely low additional costs arise due to the use of a suitable switching device, which can be embodied in the form of a solenoid on-off valve.

The brake power booster according to the present invention shown in the drawing is a so-called one-step variant. In many areas of motor vehicle manufacture, two-step variants are used to increase the brake power, in which two pistons, to which pressure is admitted, move together within the brake power booster housing. The design according to the present invention is, of course, also possible in this variant by making the additional vacuum chamber according to the present invention able to be connected to the respective pressure chambers of the individual pistons.

In addition, it is, of course, conceivable to divide the additional vacuum chamber, corresponding to the design characteristics of the brake power boosters used, into a plurality of individual chambers, which together provide the necessary vacuum for a number of braking operations.

While specific embodiments of the invention have been shown and described in detail to illustrate the application of the principles of the invention, it will be understood that the invention may be embodied otherwise without departing from such principles.

What is claimed is:

1. A brake power booster, comprising:

a brake power booster housing with at least one vacuum chamber and at least an additional pressure chamber, into which ambient pressure is admitted during the actuation of an actuating pedal for a brake system of a motor vehicle, the actuating pedal being connected to the brake power booster, a vacuum being established in the non-operative position of the actuating pedal;

a displaceable piston separating said vacuum chamber and said pressure chamber from one another;

a switching device; and at least one additional vacuum chamber, which is connected to the pressure chamber via said switching device, said switching device establishing a connection between said pressure chamber and said additional vacuum chamber during a return of the actuating pedal after actuation.

2. A brake power booster in accordance with claim 1, wherein said additional vacuum chamber is arranged within said brake power booster housing in a stiffening cavity.

3. A brake power booster in accordance with claim 1, wherein said switching device is designed as a solenoid on-off valve.

* * * * *